United States Patent
Dion et al.

(10) Patent No.: US 10,335,764 B2
(45) Date of Patent: Jul. 2, 2019

(54) METHOD FOR MANUFACTURING PLASTERBOARDS

(71) Applicant: SAINT-GOBAIN PLACO, Suresnes (FR)

(72) Inventors: Yann Dion, Livry Gargan (FR); Katarzyna Chuda, Asnieres sur Seine (FR); Caroline Demathieu-Roeltgen, Meaux (FR); Marion Chenal, Montreuil (FR)

(73) Assignee: SAINT-GOBAIN PLACO, Suresnes (FR)

( * ) Notice: Subject to any disclaimer, the term of this patent is extended or adjusted under 35 U.S.C. 154(b) by 0 days.

(21) Appl. No.: 16/084,468

(22) PCT Filed: Mar. 13, 2017

(86) PCT No.: PCT/FR2017/050563
§ 371 (c)(1),
(2) Date: Sep. 12, 2018

(87) PCT Pub. No.: WO2017/158270
PCT Pub. Date: Sep. 21, 2017

(65) Prior Publication Data
US 2019/0070585 A1 Mar. 7, 2019

(30) Foreign Application Priority Data
Mar. 14, 2016 (FR) ..................... 16 52120

(51) Int. Cl.
*B01J 20/20* (2006.01)
*B01J 20/28* (2006.01)
(Continued)

(52) U.S. Cl.
CPC ......... *B01J 20/20* (2013.01); *B01J 20/28004* (2013.01); *B01J 20/28026* (2013.01);
(Continued)

(58) Field of Classification Search
CPC ....................................................... B01J 20/20
See application file for complete search history.

(56) References Cited

FOREIGN PATENT DOCUMENTS

EP         1 847 318 A2      10/2007
WO    WO 2011/078708 A1     6/2011
(Continued)

OTHER PUBLICATIONS

International Preliminary Report on Patentability and the Written Opinion of the International Searching Authority as issued in International Patent Application No. PCT/FR2017/050563, dated Sep. 18, 2018.
(Continued)

*Primary Examiner* — Daniel H Lee
(74) *Attorney, Agent, or Firm* — Pillsbury Winthrop Shaw Pittman LLP

(57) ABSTRACT

A process for the manufacture of a plasterboard including activated carbon, includes: preparing a main mixed batch including a foaming agent and devoid of activated carbon; preparing a secondary mixed batch including powdered activated carbon; providing a first facing sheet; pouring the secondary mixed batch over the first facing sheet, the secondary mixed batch forming a first plaster layer; pouring the main mixed batch over the first plaster layer, the main mixed batch forming a second plaster layer; providing a second facing sheet on the first and second plaster layers; and forming the plasterboard; wherein the secondary mixed batch has a greater density than the main mixed batch.

15 Claims, 1 Drawing Sheet

(51) Int. Cl.
*C04B 28/14* (2006.01)
*C04B 111/00* (2006.01)

(52) U.S. Cl.
CPC ... *B01J 20/28042* (2013.01); *B01J 20/28057* (2013.01); *C04B 28/145* (2013.01); C04B 2111/0062 (2013.01)

(56) References Cited

FOREIGN PATENT DOCUMENTS

WO  WO-2011078708 A1 * 6/2011  ............. B28C 5/003
WO  WO 2015/101743 A1  7/2015

OTHER PUBLICATIONS

International Search Report as issued in International Patent Application No. PCT/FR2017/050563, dated Jun. 19, 2017.

* cited by examiner

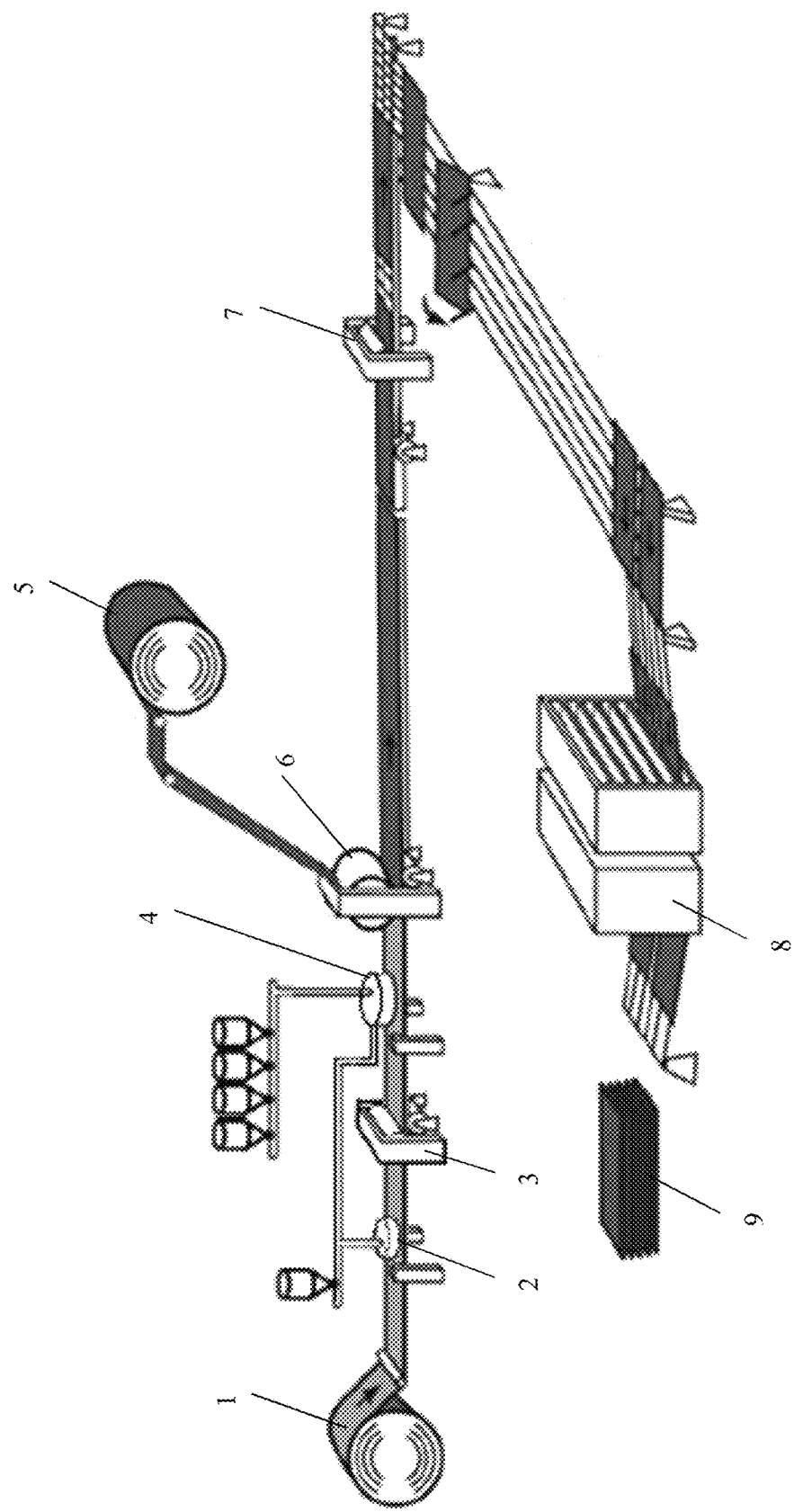

METHOD FOR MANUFACTURING PLASTERBOARDS

CROSS-REFERENCE TO RELATED APPLICATIONS

This application is the U.S. National Stage of PCT/FR2017/050563 filed Mar. 13, 2017, which in turn claims priority to French patent application number 1652120 filed Mar. 14, 2016. The content of these applications are incorporated herein by reference in their entireties.

The present invention relates to a process for the manufacture of plasterboards and more specifically of plasterboards containing activated carbon. The present invention also relates to a plasterboard containing activated carbon and also to its use for reducing the content of volatile organic compounds in buildings.

Volatile organic compounds (VOCs) are chemical substances based on carbon and hydrogen present in the air in the gas state. European Union Directive 2010/75 of Nov. 24, 2010 defines them as any organic compound having a vapor pressure of 0.01 kPa or more at a temperature of 293.15 K or having a corresponding volatility under the specific conditions of use. They comprise chemical substances of diverse natures, such as alkanes, alkenes, such as terpenes, alkynes, alcohols, aldehydes, such as formaldehyde, acetaldehyde and heptanal, ketones, ethers, such as glycol ethers, aromatic hydrocarbons, such as benzene and toluene, or halogenated hydrocarbons, such as tetrachloroethylene and dichlorobenzene. VOCs are present in the majority of paints, construction materials, dissolvents, detergents and fuels, and also in the resins, varnishes or adhesives used for furniture or electrical appliances, or also in cigarette smoke. These VOCs are encountered in the ambient air of buildings and, even if their amount appears low, they may in the long term bother the people who are exposed to them, indeed even may affect their health. In particular, some VOCs can cause allergic reactions, respiratory problems, nausea or headaches.

In recent years, the proportion of VOCs emitted by the abovementioned materials has greatly decreased as a result of stricter regulations. However, the alternative materials having little or no emission of VOCs often exhibit a greater cost and lower performance levels.

In parallel with the efforts made to control the emission of VOCs, different means which make it possible to reduce the amount of VOCs in the ambient air have thus been provided. Thus, provision has been made to incorporate adsorbing agents, such as activated carbon, in construction materials.

Plasterboards are panels comprising a layer of plaster between two facing sheets generally made of cardboard. Industrially, the process for the manufacture of plasterboards comprises three main stages: the forming, the setting and the drying. During the stage of forming the plasterboard, a mixed batch is continuously prepared in a mixer starting from plaster, water and other specific ingredients in order to adjust the properties of the mixed batch and/or of the final product. It is known in particular to add foaming agents or foam directly in order to reduce the density of the plasterboards. The mixed batch is subsequently poured continuously over a first facing sheet entrained by a conveyor belt toward an extruder in order to form the board. After the edges of the first facing sheet have been folded over, a second facing sheet is introduced at the extruder. The extruder flattens the second facing sheet over the mixed batch, smooths the surfaces and reduces the thickness of the plasterboard to the desired value. In order to improve the mechanical properties of plasterboards, it is also known to form a layer of denser plaster on one face and optionally on the edges of the plasterboard. For this, a first layer of denser mixed batch, known as roller coating layer, is poured over and formed on the first facing sheet, upstream of the pouring of the main mixed batch, which then forms a second layer known as body of the plasterboard.

Activated carbon is extremely difficult to employ on the industrial scale as a result in particular of its high specific surface and its hydrophobic nature. The problems of processability related to the incorporation of activated carbon in plasterboards furthermore have not insignificant consequences with regard to the properties and the quality of the plasterboards obtained. In particular, the applicant company has noticed that, surprisingly, activated carbon, in particular powdered activated carbon, interferes with the action of foaming agents, which can undesirably increase the density of the plasterboard. Furthermore, activated carbon is not homogeneously dispersed in the mixed batches, which can present problems for controlling the amount of activated carbon introduced and affect the effectiveness of the boards with regard to the adsorption of VOCs. The present invention provides a process for the manufacture of plasterboard which makes it possible to overcome at least one of the difficulties presented by the incorporation of activated carbon on the industrial scale.

Thus, one aspect of the present invention relates to a process for the manufacture of plasterboards comprising a board body and a roller coating layer in which powdered activated carbon is introduced into the mixed batch intended for the formation of the roller coating layer and the mixed batch intended for the formation of the body of the board does not comprise activated carbon. This is because the mixed batch intended for the formation of the body of the board has a foamy aspect in order to reduce the weight of the plasterboard. The introduction of activated carbon into this mixed batch would have the effect of destroying this foam. The roller coating layer for its part exhibits a greater density than the body of the board. The presence of foam in the mixed batch intended for the formation of the roller coating layer is thus not desired. Consequently, the introduction of activated carbon into the mixed batch intended for the formation of the roller coating layer does not bring about an undesirable increase in weight of the plasterboard. On the contrary, the antifoaming effect of the activated carbon can advantageously be taken advantage of to remove the foam possibly present in the mixed batch intended for the roller coating layer.

The present invention thus relates to a process for the manufacture of plasterboards comprising activated carbon, said process comprising:
- the preparation of a main mixed batch devoid of activated carbon;
- the preparation of a secondary mixed batch comprising powdered activated carbon;
- the provision of a first facing sheet;
- the pouring of the secondary mixed batch over the first facing sheet, said secondary mixed batch forming a first plaster layer;
- the pouring of the main mixed batch over the first layer, said main mixed batch forming a second plaster layer;
- the provision of a second facing sheet on said first and second layers; and
- the forming of the plasterboard;

in which the first layer has a greater density than the first layer. As the first layer is denser than the second layer, it is understood that the secondary mixed batch also exhibits a greater density than the main mixed batch. In other words, the secondary mixed batch exhibits a less foamy nature than the main mixed batch. For this, the main mixed batch comprises a foaming agent. The foaming agent is generally introduced into the main mixed batch in the form of a foam obtained from water and the foaming agent. The main mixed batch typically comprises from 2 to 10 parts of foam obtained from a mixture of water and a foaming agent. The density of the secondary mixed batch is generally greater by at least 5% and preferably greater by at most 40% with respect to the main mixed batch, for example greater by 15 to 25% with respect to the main mixed batch. The main mixed batch typically exhibits a density of 0.6 to 1.5, preferably of 0.8 to 1.3. The secondary mixed batch typically exhibits a density of 1.0 to 2.3, preferably of 1.3 to 2.0.

The term "plaster" within the meaning of the present invention denotes in general both the set plaster, that is to say calcium sulfate dihydrate ($CaSO_4.2H_2O$), and the non-set plaster, that is to say calcium sulfate hemihydrate ($CaSO_4.\frac{1}{2}H_2O$). The expression "plasterboard" denotes, for example, the finished product formed by set plaster but also a plasterboard in the course of manufacture in which the plaster is not completely set. In some cases, the term "plaster" will, however, be understood within the strict meaning, that is to say denoting calcium sulfate hemihydrate. This is obvious, for example, when the term "plaster" is used with reference to the starting material for the preparation of the mixed batches. Likewise, when reference is made to an amount with respect to the dry weight of plaster, the latter is considered in its calcium sulfate hemihydrate form.

The plasterboard generally has a thickness of 6 to 25 mm, preferably 10 to 15 mm. The first plaster layer is a roller coating layer. The second plaster layer forms the body of the plasterboard. "Roller coating layer" within the meaning of the present invention denotes a plaster layer of low thickness exhibiting a greater density than the layer forming the body of the plasterboard. "Body" of the plasterboard within the meaning of the present invention denotes a plaster layer, the thickness of which is at least equal to half the thickness of the plasterboard. The first plaster layer typically has a thickness of less than 4 mm, for example of 0.1 to 4 mm, preferably of 0.8 to 3 mm. The second plaster layer typically has a thickness of 6 to 25 mm, preferably of 10 to 15 mm. The density of the first plaster layer is generally greater by at least 5% and preferably greater by at most 40% with respect to the second layer, for example greater by 15 to 25% with respect to the second layer. The first layer typically has a density of 0.8 to 1.5, preferably of 1.0 to 1.2. The second layer typically has a density of 0.4 to 1.5, preferably of 0.6 to 1.0. In the present invention, the density of a body is defined conventionally, that is to say by the ratio of the density of said body to the density of water, taken equal to 1000 $kg/m^3$.

The activated carbon in accordance with the present invention is a powdered activated carbon. This is because, at an equal specific surface, a powdered carbon exhibits a greater effectiveness of absorption of VOCs than a granulated activated carbon when they are introduced into a plasterboard. Furthermore, although granular activated carbon exhibits a lower antifoaming effect than powdered activated carbon and would make it possible to obtain a plasterboard of satisfactory density, the introduction of granular activated carbon into the body of the board is not advantageous. This is because the applicant company has noticed that, surprisingly, it is possible to significantly reduce the amount of activated carbon in the plasterboard while significantly improving the effectiveness of the boards with regard to the absorption of VOCs when the activated carbon is introduced in the powder form into the roller coating layer. In the present invention, when it is mentioned that a mixed batch or a layer is devoid of activated carbon, this means that the mixed batch or the layer does not comprise activated carbon, whatever its form, in particular powdered or granular. The powdered activated carbon according to the invention typically exhibits a mean particle size of 1 to 100 µm, preferably of 10 to 50 µm. The mean particle size is measured using an air jet sieve according to the standard ASTM-D-5158-93, "Standard Test Method for Determination of the Particle Size of Powdered Activated Carbon by Air Jet Sieving". It typically exhibits a specific surface of at least 100 $m^2/g$, preferably of at least 250 $m^2/g$, more preferably of at least 500 $m^2/g$ and up to 1500 $m^2/g$, indeed even 2000 $m^2/g$ and even 2500 $m^2/g$. The specific surface is measured by using the BET method with nitrogen according to the standard ISO 9277:2010.

The secondary mixed batch typically comprises from 0.1 to 10% by weight, preferably from 0.5 to 3% by weight, of powdered activated carbon. The secondary mixed batch preferably comprises activated carbon solely in the powder form. In particular, the secondary mixed batch is preferably devoid of granular activated carbon. In a specific embodiment, the preparation of the secondary mixed batch preferably comprises the preparation of a premix of the powdered activated carbon with a plasticizer in water and the addition of said premix to the mixed batch. This is because the applicant company has noticed that a premix of the powdered activated carbon with the plasticizer makes it possible to obtain a sufficiently stable suspension making possible suitable metering of the activated carbon, in particular during continuous industrial processes, and a more homogeneous distribution of the latter in the mixed batch obtained and consequently in the plasterboards manufactured. The premix typically comprises from 1 to 25% by weight, preferably from 5 to 15% by weight, of powdered activated carbon. It typically comprises at least 0.01%, preferably from 0.05 to 5% and more preferably from 0.1 to 3% by weight of plasticizer. The plasticizer can be chosen in particular from polycarboxylates, in particular polycarboxylate ethers, sulfonated polynaphthalenes (salts of sulfonated polycondensates of naphthalene and formaldehyde), lignosulfonates, sulfonated melamine resins (salts of sulfonated polycondensates of melamine and formaldehyde) and polyacrylates commonly used in the manufacture of plasterboards. Mention may be made, as examples of plasticizers, of those sold under the Glenium® name by BASF, under the Flube® name by Bozzetto, under the Chrysofluid® name by Chryso, under the Viscocrete® name by Sika, under the Melment® name by BASF or also under the Mapefluid® name by Mapei. The plasticizer is preferably chosen from sulfonated polynaphthalenes and sulfonated melamine-formaldehyde resins, more preferably from sulfonated polynaphthalenes.

The main mixed batch typically comprises, per 100 parts by weight of plaster:
  from 50 to 200 parts of water;
  from 2 to 10 parts of foam obtained from a mixture of water and a foaming agent, for example an alkyl sulfate, optionally as a mixture with an alkyl ether sulfate; and
  from 0.1 to 1 part of setting accelerator, for example calcium sulfate hydrate or potassium sulfate.

It can comprise processing aids which make it possible to adjust the properties of the mixed batches and also other functional agents which make it possible to modify the properties of the final plasterboard. The processing aids well known to a person skilled in the art can in particular be adhesion agents, setting retarders, setting accelerators, plasticizers or thickening agents. The functional agents also well known to a person skilled in the art can be biocidal agents, water repellents, flame retardants or reinforcing agents. By way of example, the main mixed batch can comprise one or more of the following components:

- from 0.1 to 15 parts of an adhesion agent, for example a poly(vinyl acetate), a poly(vinyl alcohol), a starch, in particular pretreated with an acid or pregelatinized, a dextrin or a vegetable flour, in particular wheat or corn flour;
- from 0.001 to 10 parts of a biocide, for example carbamates, such as 3-iodoprop-2-yn-1-yl butylcarbamate, or pyrothione complexes;
- from 0.1 to 10 parts of at least one water repellent, for example a siloxane, a polysiloxane or a wax;
- from 0.1 to 20 parts of at least one flame retardant, for example vermiculite, silica, in particular of micrometric dimension, or a clay; and/or
- from 0.1 to 20 parts of at least one reinforcing agent, for example polymer fibers, mineral fibers, in particular glass fibers, or plant fibers.

The composition of the secondary mixed batch is as described above for the main mixed batch, except for the fact that it does not contain foam and that it comprises powdered activated carbon, as described above. The main mixed batch and the secondary mixed batch can be prepared independently. In this case, there is no foam added to the secondary mixed batch during its preparation. The secondary mixed batch is, however, preferably obtained from the main mixed batch. In this case, a portion of the main mixed batch is withdrawn and the foam has to be broken in order to prepare the secondary mixed batch. This is because the secondary mixed batch has to exhibit a less foamy nature than the main mixed batch, preferably a non-foamy nature, in order to make possible the formation of a roller coating layer which is denser than the body of the board. In order to break the foam present in the main mixed batch, it is generally necessary to add an antifoaming agent thereto. However, the process according to the invention makes it possible to benefit from the antifoaming properties of the powdered activated carbon while reducing the amount of antifoaming agent necessary, indeed even while not adding any antifoaming agent other than the powdered activated carbon to the portion of the main mixed batch withdrawn in order to prepare the secondary mixed batch. In a specific embodiment, the process according to the present invention thus comprises:

- the preparation of a main mixed batch devoid of activated carbon;
- the withdrawal of a portion of the main mixed batch;
- the addition of powdered activated carbon to the withdrawn portion of the main mixed batch in order to obtain a secondary mixed batch;
- the provision of a first facing sheet;
- the pouring of the secondary mixed batch over the first facing sheet, said secondary mixed batch forming a first plaster layer;
- the pouring of the main mixed batch over the first layer, said main mixed batch forming a second plaster layer;
- the provision of a second facing sheet on said first and second layers; and
- the forming of the plasterboard;

in which the first layer has a greater density than the first layer. Preferably, no antifoaming agent other than the powdered activated carbon is added to the withdrawn portion of the main mixed batch in order to obtain the secondary mixed batch.

FIG. 1 diagrammatically illustrates an example of an industrial line which makes possible the implementation of the process according to the invention. A main mixed batch is prepared continuously in a main mixer 4. A portion of the main mixed batch is withdrawn at the main mixer 4 and sent via a pipe to a secondary mixer 2 and mixed with the powdered activated carbon in order to obtain a secondary mixed batch. A first facing sheet 1 generally forming the front face of the plasterboard (face visible during the installation of the board) is entrained by a conveyor belt. The secondary mixed batch is poured continuously from the secondary mixer 2 over the first facing sheet 1 and formed into a first homogeneous layer by an assembly of rollers 3. This first layer will give the roller coating layer. At a predetermined distance which makes possible sufficient setting of the first layer, the main mixed batch is poured from the main mixer 4 over the first layer. A second facing sheet 5 is introduced above the main mixed batch at the main extruder 6. A strip of plaster is extruded at the desired thickness by the main extruder 6, which distributes the main mixed batch to form the layer which will give the body of the board. After the transportation of the strip of plaster for a period of time appropriate for allowing sufficient setting of the plaster, the strip of plaster is cut to the desired dimension by a rotating knife 7. The board is subsequently generally turned over in order to prevent damage to the front face of the board and transported toward a series of dryers in stage 8, in order to complete the setting of the plaster and to remove the excess water, before being packaged and sent to the storage zone 9.

The present invention also relates to a plasterboard comprising powdered activated carbon obtained by the process as defined above. More specifically, the present invention relates to a plasterboard comprising a first plaster layer and a second plaster layer, characterized in that the first layer is denser than the second layer; the first layer comprises powdered activated carbon; and the second layer is devoid of activated carbon. The plasterboard according to the invention typically comprises from 0.01 to 2%, preferably from 0.05 to 1%, by weight of activated carbon, with respect to the dry weight of plaster. In particular, the first layer typically comprises from 0.2 to 10%, preferably from 1 to 5%, by dry weight of powdered activated carbon, with respect to the dry weight of plaster. The first layer preferably comprises activated carbon solely in the powder form. In particular, it is preferably devoid of granular activated carbon. The thicknesses and densities of the first and second layers are preferably as described above.

The present invention also relates to the use of a plasterboard as described above for reducing the amount of VOCs in the air inside buildings. The VOCs are preferably chosen from formaldehyde, hexanal, benzene, toluene, tetrachloroethene, 1,2-dichlorobenzene and undecane.

The invention is illustrated with the help of the following nonlimiting examples.

EXAMPLE 1

A reference board P0 formed of just one body layer with a thickness of 12.5 mm is manufactured from the main mixed batch comprising 100 parts by weight of plaster ($CaSO_4 \cdot \frac{1}{2}H_2O$), 75 parts of water, 4 parts of foam (obtained from water containing 1% by weight of sodium lauryl sulfate), 5 parts of starch, 3 parts of plasticizer and 0.5 part of accelerator. The different ingredients are weighed and mixed using a mixer and a paddle of deflocculating type at 1600 rev/min for one minute in order to obtain a homogeneous paste. The foam is prepared at the desired density and mixed with the paste obtained in a mixer with a paddle at 250 rev/min in order to obtain a main mixed batch. A first sheet of cardboard is positioned in a mold having dimensions of 20×25 cm and with a thickness of 12.5 mm. The main mixed batch is poured onto the first cardboard and leveled at the thickness of the mold. A second sheet of cardboard is positioned on the main mixed batch and the mold is closed in order to maintain a pressure on the board. After hardening of the board, the latter is removed from the mold and dried in a drying oven at 40° C. for 24 hours.

A board P1 formed of just one body layer with a thickness of 12.5 mm is manufactured in the same way as the board P0, except that the main mixed batch comprises 2.8% by weight of granular activated carbon (GAC) sold under the reference Envirocarb® 207C and having a specific surface of 1100 m²/g and a mean particle size of approximately 2.4 mm. The amount of activated carbon in the board P1 is approximately 210 g/m².

A board P2 formed of just one body layer with a thickness of 12.5 mm is manufactured in the same way as the board P1, except that the activated carbon used is a powdered activated carbon (PAC) sold under the reference Pulsorb® 208CP and having a specific surface of 1200 m²/g and a mean particle size of approximately 30 µm. The amount of activated carbon in the board P2 is approximately 210 g/m².

A board P3 formed of a body layer of 11.5 mm and of a roller coating layer with a thickness of 1 mm is manufactured from a main mixed batch identical to the board P0 for the body layer and from a secondary mixed batch for the roller coating layer. The secondary mixed batch is prepared by adding 35% by weight of powdered activated carbon (PAC) Pulsorb® 208CP to a mixed batch identical to the main mixed batch. A first sheet of cardboard is positioned in a mold having dimensions of 20×25 cm and with a thickness of 12.5 mm. The secondary mixed batch is poured onto the first cardboard and leveled at a thickness of approximately 1 mm. The main mixed batch is poured on to the secondary mixed batch when the latter is sufficiently set, and leveled at the thickness of the mold. A second sheet of cardboard is positioned on the main mixed batch and the mold is closed in order to maintain a pressure on the board. After hardening of the board, the latter is removed from the mold and dried in a drying oven at 40° C. for 24 hours. The amount of activated carbon in the board is approximately 210 g/m².

The densities of the boards P0 to P3 are presented in the table. The boards P1 and P2, in which activated carbon has been introduced into the body of the board, exhibit a greater density than the reference board P0. It is assumed that the activated carbon interferes with the action of the foaming agent, which has the effect of destroying the foam and of increasing the density of the plasterboard. This effect is particularly marked for the board P2, which comprises powdered activated carbon. On the other hand, the board P3 exhibits a comparable density to the reference board P0.

TABLE 1

|  | P0 | P1 | P2 | P3 |
|---|---|---|---|---|
| Density | 0.72 | 0.76 | 1 | 0.72 |

In order to avoid an undesirable increase in the density of the plasterboard, the activated carbon thus has to be used either in the granule form in the body of the board or in the powder form in the roller coating layer.

EXAMPLE 2

A board A formed of just one body layer with a thickness of 12.5 mm comprising granular activated carbon (GAC) is manufactured in the same way as the board P1, except that the mixed batch comprises 1% by weight of activated carbon instead of 2.8%. The amount of activated carbon in the board is approximately 76 g/m².

A board B formed of a body layer of 11.5 mm and of a roller coating layer with a thickness of 1 mm comprising powdered activated carbon (PAC) is manufactured in the same way as the board P3, except that the secondary mixed batch comprises 1% by weight of activated carbon instead of 35%. The amount of activated carbon in the board is approximately 6 g/m².

The ability of each of the boards to trap VOCs was subsequently evaluated according to the standard ISO1600-24:2009 at a temperature of 23° C.±2° C. and a relative humidity of 50%±5% during the test. The load factor of the board is set at 1 m²/m³, the rate of replacement of the air at 0.5 vol·h$^{-1}$ and the concentrations of benzene at 5 µg·m$^{-3}$, of toluene at 36 µg·m$^{-3}$, of heptanal at 19 µg·m$^{-3}$, of tetrachloroethene at 6 µg·m$^{-3}$, of dichlorobenzene at 5.5 µg·m$^{-3}$ and of undecane at 18 µg·m$^{-3}$. The percentage of reduction in the content of the VOC considered for each of the boards is shown in table 2.

TABLE 2

|  | A | B |
|---|---|---|
| Type and amount of activated carbon in the board | GAC 76 g/m² (in the body) | PAC 6 g/m² (in the roller coating) |
| Benzene | 50 | 85 |
| Toluene | 34 | 65 |
| Heptanal | 54 | 64 |
| Tetrachloroethene | 45 | 76 |
| Dichlorobenzene | 50 | 74 |
| Undecane | 40 | 69 |

At an unchanging specific surface and despite a much greater amount of activated carbon in the board A, the board B is much more effective in trapping the VOCs. In addition to preventing an undesirable increase in the density of the board (cf. example 1), the introduction of powdered activated carbon into the roller coating layer makes it possible to increase the effectiveness of trapping of the VOCs while significantly reducing the amount of activated carbon necessary, in comparison with the use of granular activated carbon in the body of the board.

EXAMPLE 3

Tests of stabilization of activated carbon in aqueous suspension have been carried out with different surfactants (comparative examples C1 to C5) and also plasticizers used in the manufacture of the plasterboards (examples according to the invention I1 to I3). FL1 and FL2 are plasticizers of sulfonated polynaphthalene type and FL3 is a plasticizer of sulfonated melamine resin type. The premixes were prepared using a mixer of electric stirrer type at 700 rev/min.

The stability of the suspensions was evaluated by visual observation: the premix is placed in a transparent container and observed with the naked eye at regular time intervals. The stability of the suspensions is measured by noting the height of the column (clear supernatant). The results, summarized in table 3, are expressed as percentage of the water column (clear supernatant) height with respect to the total height of the suspension.

TABLE 3

|  | C0 | C1 | C2 | C3 | C4 | C5 | I1 | I2 | I3 |
|---|---|---|---|---|---|---|---|---|---|
| Water | 90 | 90 | 90 | 90 | 90 | 90 | 90 | 90 | 90 |
| PAC | 10 | 10 | 10 | 10 | 10 | 10 | 10 | 10 | 10 |
| SDS[a] | — | 0.3 | — | — | — | — | — | — | — |
| Tween 80 | — | — | 2.1 | — | — | — | — | — | — |
| Triton[b] | — | — | — | 0.08 | — | — | — | — | — |
| DDM[c] | — | — | — | — | 0.1 | — | — | — | — |
| CHAPS[d] | — | — | — | — | — | 0.1 | — | — | — |
| FL 1 | — | — | — | — | — | — | 0.6 | — | — |
| FL 2 | — | — | — | — | — | — | — | 0.6 | — |
| FL 3 | — | — | — | — | — | — | — | — | 0.6 |
| Precipitated at 1 h | 90 | 50 | 50 | 90 | 80 | 90 | 10 | 5 | 10 |
| Precipitated at 1 d | 90 | 90 | 90 | 90 | 90 | 90 | 20 | 10 | 20 |
| Precipitated at 3 d | 90 | 90 | 90 | 90 | 90 | 90 | 20 | 10 | 20 |

[a]Stepanol EHS, sold by Stepan
[b]Triton-X100, sold by SPI
[c]n-dodecyl-β-D-maltoside
[d]3-[(3-Cholamidopropyl)dimethylammonio]propanesulfonate The plasticizers make it possible to stabilize the powdered activated carbon much more effectively than the conventional surfactants. The preparation of a premix of powdered activated carbon in aqueous suspension with a plasticizer thus makes possible better control of the amount of activated carbon added, in particular during continuous industrial processes. This also makes possible a more homogeneous distribution of the activated carbon in the roller coating layer and consequently a better effectiveness of the boards with regard to the trapping of the VOCs and a better consistency between the plasterboards. Finally, the use of plasticizers already used in the preparation of the mixed batch has the advantage of avoiding the use of additional adjuvants which might modify the properties of the mixed batch and/or disrupt the manufacturing process.

The invention claimed is:

1. A process for the manufacture of a plasterboard comprising activated carbon, said process comprising:
    preparing a main mixed batch comprising a foaming agent and devoid of activated carbon;
    preparing a secondary mixed batch comprising powdered activated carbon;
    providing a first facing sheet;
    pouring the secondary mixed batch over the first facing sheet, said secondary mixed batch forming a first plaster layer;
    pouring the main mixed batch over the first plaster layer, said main mixed batch forming a second plaster layer;
    providing a second facing sheet on said first and second plaster layers; and
    forming the plasterboard;
    wherein the secondary mixed batch has a greater density than the main mixed batch.

2. The process as claimed in claim 1, wherein the second plaster layer has a thickness at least equal to half the thickness of the plasterboard.

3. The process as claimed in claim 1, wherein the first plaster layer has a thickness of less than 4 mm and the second plaster layer has a thickness of 6 to 25 mm.

4. The process as claimed in claim 1, wherein the secondary mixed batch has a density greater by at least 5% with respect to the main mixed batch.

5. The process as claimed in claim 1, wherein the main mixed batch has a density of 0.8 to 1.3 and the secondary mixed batch has a density of 1.3 to 2.0.

6. The process as claimed in claim 1, wherein the main mixed batch comprises, per 100 parts by weight of plaster:
    from 50 to 200 parts of water;
    from 2 to 10 parts of foam obtained from a mixture of water and a foaming agent; and
    from 0.1 to 1 part of setting accelerator.

7. The process as claimed in claim 1, wherein the powdered activated carbon has a specific surface of 100 to 2500 $m^2/g$ and a mean particle size of 1 to 100 µm.

8. The process as claimed in claim 1, wherein the secondary mixed batch is obtained from the main mixed batch.

9. The process as claimed in claim 1, wherein the secondary mixed batch comprises from 0.1 to 10% by weight of powdered activated carbon.

10. The process as claimed in claim 1, wherein the preparation of the secondary mixed batch comprises the preparation of a premix of powdered activated carbon with a plasticizer in water and the addition of said premix to the main mixed batch.

11. The process as claimed in claim 10, wherein the premix comprises from 1 to 25% by weight of powdered activated carbon.

12. The process as claimed in claim 10, wherein the premix comprises at least 0.01% by weight of plasticizer.

13. The process as claimed in claim 10, wherein the plasticizer is chosen from polycarboxylates, sulfonated polynaphthalenes, lignosulfonates, sulfonated melamine resins and polyacrylates.

14. The process as claimed in claim 1, wherein the secondary mixed batch is devoid of antifoaming agent.

15. A plasterboard obtained by the process as defined in claim 1.

* * * * *